United States Patent Office 3,623,838
Patented Nov. 30, 1971

3,623,838
PROCESS FOR THE PRODUCTION OF LEAD OXIDES
Wilhelm Kunz, Cologne-Mulheim, and Walter Breckheimer, Bensberg, Germany, assignors to Lindgens & Sohne, Cologne-Mulheim, Germany
No Drawing. Filed Dec. 19, 1968, Ser. No. 785,386
Claims priority, application Austria, Jan. 3, 1968, A 71/68
Int. Cl. C01g 21/06, 21/10
U.S. Cl. 23—146                                    9 Claims

ABSTRACT OF THE DISCLOSURE

The red modification of lead oxide, which is convertible to $Pb_3O_4$ by oxidation at below about 500° C. or to the yellow modification of PbO by oxidation at above about 550° C., is produced. The raw oxide produced is in a highly reactive form having low abrasion and satisfactory free flowing properties and is free of added bonding agent. Production is effected by adding about 4 to 10% water to raw lead oxide particles containing less than about 30% metallic lead, the raw lead oxide not containing a substantial amount of particles of more than 20 microns diameter. The mixture of water and raw lead oxide is granulated, and the granules are dried.

---

This invention relates to a process for the production of lead oxides.

As is known, large-scale production of the lead oxides PbO (litharge) and $Pb_3O_4$ (red lead) is generally effected in two stages. In the first stage, metallic lead is converted into a raw oxide which consists of 70 to about 100% of PbO and 30 to about 0% of metallic lead. In the second stage, either pure PbO is obtained by heating to temperatures above 550° C. or $Pb_3O_4$ is obtained by heating to temperatures below 500° C. For the production of PbO, e.g. by the Barton process, raw oxides having a metallic lead content of less than 5% are used while raw oxides containing 5 to 30% of metallic lead are used for the production of $Pb_3O_4$.

PbO is known to exist in a yellow and a red modification. The red modification can be oxidized to $Pb_3O_4$ at a substantially higher rate than the yellow modification.

However, the particle size of the PbO plays also a decisive part in commercial production of $Pb_3O_4$ from raw lead oxide. For example, very fine lead oxides types such as PbO produced by sublimation have a sufficiently large surface area and consequently a sufficiently high surface energy that the yellow modification of PbO is also oxidized relatively rapidly to $Pb_3O_4$.

In addition to the reaction temperature, oxygen partial pressure, surface condition and porosity of the material being reacted, the oxidation of lead oxide to form $Pb_3O_4$ may also be influenced by oxidation catalysts. This influence, e.g. of heavy metals suc has bismuth in amounts of about 50 to 500 grams per metric ton plays a part above all in those cases where the raw oxides used as starting material have a very small surface area such as raw oxides derived from the Barton process and having a surface area of about 1 to 2 sq. m. per gram.

Although the processes used to produce the different lead oxides are known since decades, there is still a need for improvement of the production processes and for obtaining products having improved properties and meeting the constantly increasing requirements of the consumers and especially the various requirements in the individual fields of application.

When studying the different oxidation processes, it has now been found that it is possible when maintaining specific process conditions to recover lead oxides the properties and the behavior of which in the oxidation itself differ favorably from the previously known species independently of the type of the starting product. It has been found very surprisingly that both raw oxides having a metallic lead content of less than 5% and obtained, for example, by the Barton process and raw oxides having a metallic lead content of more than 5%, especially of 10 to 30% can be converted almost completely into the red modification of PbO when water is added. The oxidation rate of the product obtained is substantially higher than that of the raw oxides and may be as high as ten times the oxidation rate of the starting product. When converting both types of the raw oxide, i.e. raw oxide which may have a low lead content and raw oxide having a comparatively high lead content, into the red modification of lead oxide, the initially present primary grain is disintegrated and a product is obtained which has a substantially smaller particle size and in which about half the metallic lead having been present has reacted with water with a decrease in metallic lead content in the oxide.

However, the larger surface area of the product obtained by addition of water and the higher reactivity as compared with the starting oxide have disadvantages when carrying out the oxidation process on a commercial scale since, for example when operating in a crucible furnace provided with a rabble, the finely divided litharge cakes together to form solid cakes and sticks to the walls of the furnace thereby causing troubles and breakdown when carrying out the oxidation process. However, these disadvantages are also eliminated in accordance with the invention because a method was found which permits the starting product converted in the first process stage to be oxidized in a form which shows no longer the difficulties mentioned above.

The new process for the production of lead oxides, viz, $Pb_3O_4$ and PbO in both modifications, comprises subjecting a raw oxide which, if desired, has been comminuted by grinding to granulation with the addition of water in a manner known per se, but preferably without the addition of a further binder; drying the resultant granules and recovering either directly the red modification of PhO or oxidizing this oxide at temperatures up to 500° C., especially at 450° C., to form $Pb_3O_4$ or converting it into the yellow modification of PbO at temperatures in excess of 550° C. and preferably between 600 and 700° C.

When starting from a raw lead oxide which is free from metallic lead or contains up to 5% of metallic lead, it being possible for this starting product to be, for example, a sublimed PbO, it is desirable first of all to establish in a preliminary experiment in which a sample of the material is slurried with water and dried whether grinding is necessary prior to granulation. If the slurried sample disintegrates on drying, the raw oxide must be ground while grinding is unnecessary if it does not disintegrate. The raw oxide which, if necessary, has been ground is then granulated in a manner known per se with the addition of water in an amount of about 4 to 10% and preferably 5 to 8% to form granules of red PbO which is then dried and either oxidized to form $Pb_3O_4$ or further processed to yellow PbO. As compared with the raw oxide used as the starting material, this red PbO has a substantially lower content of metallic lead which, for example, has been reduced from the initial amount of 1% to less than 0.05%. This is doubtlessly due to the fact that the metallic lead has reacted with water to form OH-containing lead compounds which simultaneously act as binders. The granular lead oxide, in contrast to other known pellets, does not contain a binder other than water and, after drying, has a large pore volume and, at the same time, a particular reactivity as indicated by the fact that the conversion into $Pb_3O_4$ by oxidation can be effected in substantially shorter times than was previously possible. Drying of the granules is advantageously effected within about 1 hour at heating gas temperatures ranging between 200 and 350° C. and the dry granules are then converted into $Pb_3O_4$ by thermal aftertreatment at temperatures of 400 to 500° C.

With a granule diameter of 1 to 3 mm. and a load per unit surface of, for example, 100 kilograms per square meter, this thermal aftertreatment gives after as little as 2¼ hours a product which contains 97% of $Pb_3O_4$. On the other hand, when using granular products with a heterogeneous particle size between 0.1 and 3 mm., the material is packed more densely in the reaction chamber and the reaction time which is necessary to obtain also a finished product containing 97% of $Pb_3O_4$ is about 4 to 7 hours at 450° C.

In view of the prior art in the field of $Pb_3O_4$ production, it was extremely surprising that the reaction time can be reduced by at least 90% as compared with the previously known processes where 40 to 60 hours are generally necessary to obtain a 97% $Pb_3O_4$. This could not be predicted since, on the one hand, lead oxide grains oxidize very slowly and, on the other hand, the used raw oxide prepared from refined lead and hardly containing heavy metal catalysts contained only 10% of $Pb_3O_4$ after a reaction time of 8 hours and only 30% of $Pb_3O_4$ after a reaction time of 16 hours when subjected to thermal treatment at 450° C. with access of air.

Furthermore, it could not be predicted that, despite the chemical conversion of PbO into $Pb_3O_4$, not only the original structure of the granules is retained but also their hardness undergoes substantially no change in the reaction.

On the other hand, when effecting the thermal aftertreatment at higher temperatures, i.e. in excess of 500° C. up to 650° C., this "calcining" gives the yellow modification of PbO which is also in the form of granules.

The operating method just described for the production of $Pb_3O_4$ is, of course, also applicable to a raw oxide starting material which contains more than 5% of metallic lead, especially from 10 to 30% of metallic lead. In this case, it is merely necessary that the raw oxide which, if necessary, has been ground or not depending upon the preliminary experiment described above, is again granulated in a manner known per se with the addition of about 4 to 10% and preferably 6 to 9% of water, then dried and subsequently either oxidized to form $Pb_3O_4$ or converted into the yellow modification of PbO.

The use of fine-grained raw oxides which do not contain a substantial amount of particles of more than 20 microns in diameter has been found to be particularly advantageous in the process according to the invention, granules having a uniform particle diameter to the greatest extent possible being desirably used in the second process stage to achieve particularly short reaction times.

Thus, it is possible by means of the process according to the invention to produce granulated lead oxides, viz both $Pb_3O_4$ and PbO in the red and yellow modification, which do not contain extraneous constituents or residual bonding agent so that they can be used in any field and adjusted in accordance with the requirements of the processors. The granular lead oxides obtained in accordance with the invention and having high hardness, low abrasion and excellent free flowing properties are particularly suitable for commercial use in glass, ceramics and accumulator industries. The size of the granules is desirably selected so as being favorable for the particular use, e.g. from 0.2 to 3 mm.

It is also possible to grind these granular products in conventional manner thereby achieving a quality which is characterized by an extremely high degree of dispersion.

For carrying out the process, oxidation in rabble furnaces is readily possible because the agglomeration of the material being reacted and the jamming of the rabble arms frequently encountered heretofore in rabble furnaces are avoided in the process according to the invention. However, it is also possible to carry out the oxidation of the granules in rotary furnaces and even without any recirculation of the material being reacted, very good results being obtained even with loads per unit surface of about 100 kilograms per square meter. However, in case of higher loads per unit surface, it is desirable to purge the stationary reacting material with air or oxygen-containing gases.

EXAMPLE 1

Raw lead oxide containing about 1% of metallic lead and 40 p.p.m. of bismuth is ground on a pinned disc mill and granulated in a countercurrent mixer-granulator with the addition of 6% of water. The initial lead content has been reduced by this treatment to about 0.04%. This product is useful as granulated lead oxide for all commercial applications.

EXAMPLE 2

Lead oxide in granular form obtained by the procedure of Example 1 is oxidized in a laboratory furnace with air at 450° C. After 3 hours, the product has achieved a $Pb_3O_4$ content of about 96%. The structure and hardness of the granules are unchanged.

In contrast hereto, the unground raw oxide of Example 1 shows a perceptible beginning of the reaction only after 4 hours and contains about 43% of $Pb_3O_4$ after 16 hours while the corresponding ground raw oxide contains about 50% of $Pb_3O_4$ after 4 hours and 97% of $Pb_3O_4$ after 16 hours.

EXAMPLE 3

Raw oxide containing 30% of metallic lead and 400 p.p.m. of bismuth is granulated in a countercurrent mixer-granulater with the addition of 8% of water without previous grinding and subsequently dried. The granules are then heated to a temperature of 450° C. with access of air. After a reaction time of 8 hours, a $Pb_3O_4$ content of 96% is found. The structure of the granules is unchanged, but the hardness is higher than that of the granules which have only been dried.

The raw oxide which has not been granulated and was partially present already in the form of the red modification reaches the same degree of oxidation after as much as 16 hours.

If the products granulated according to the above examples are treated with air or oxygen at 650° C. instead of 450° C., the yellow modification of PbO is obtained in place of $Pb_3O_4$.

What is claimed is:

1. In the production of raw lead oxide in the red modification thereof convertible to $Pb_3O_4$ by oxidation at below about 500° C., or to the yellow modification of PbO by oxidation at above about 550° C., providing the raw oxide in a highly reactive form having low abrasion and satisfactory free flowing properties and free of added bonding agent, by steps comprising:
   (a) adding about 4 to 10% water to raw lead oxide particles containing less than about 30% metallic lead, the raw oxide not containing a substantial amount of particles of more than 20 microns diameter,
   (b) granulating the mixture of water and raw lead oxide particles,
   (c) drying the granules produced in step (b) to provide dry granules having a diameter of 0.1 to 3 mm. to produce said raw lead oxide in the red modification convertible to $Pb_3O_4$ or the yellow modification of PbO as aforesaid.

2. Process according to claim 1 wherein substantially all of the granules being 0.2 to 3 mm. in diameter.

3. Process according to claim 1 wherein $Pb_3O_4$ is produced from the dried granules by oxidizing the granules at below about 500° C.

4. Process according to claim 1 wherein PbO is produced in the yellow modification thereof from the dried granules by oxidizing the granules at above about 550° C.

5. Process according to claim 1, wherein before step (a), the raw lead oxide particles are conditioned for the granulation by grinding thereof.

6. Process according to claime 1, wherein the raw lead oxide particles contain less than about 5% metallic lead and the amount of water is about 5 to 8%.

7. Process according to claim 1, wherein the raw lead oxide particles contain about 5–30% metallic lead and the amount of water is about 1 to 9%.

8. Process according to claim 1, wherein substantially all of the granules being 0.1 to 3 mm. in diameter.

9. Process according to claim 1 wherein said drying is effected by heating for about 1 hour at 200–350° C.

References Cited

UNITED STATES PATENTS 1,617,887  2/1927  Wilhelm _____ 23—146

OSCAR R. VERTIZ, Primary Examiner

H. S. MILLER, Assistant Examiner